Jan. 17, 1961   M. S. DI PERNA   2,968,071
WINDSHIELD CLEANER
Filed Sept. 10, 1958   2 Sheets-Sheet 1
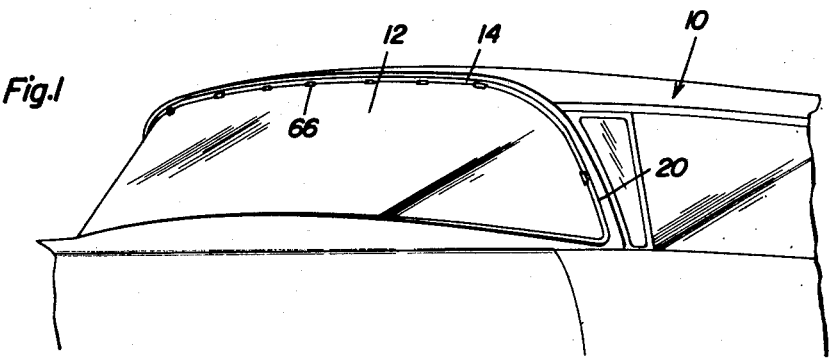
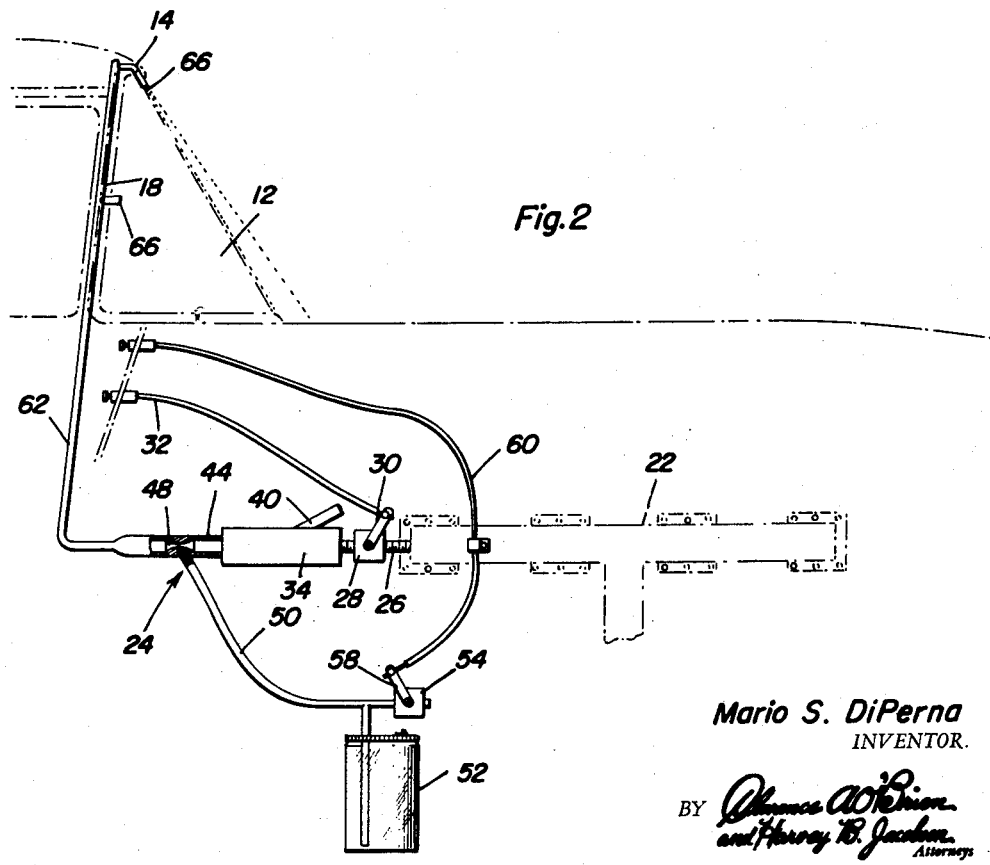
Mario S. DiPerna
INVENTOR.

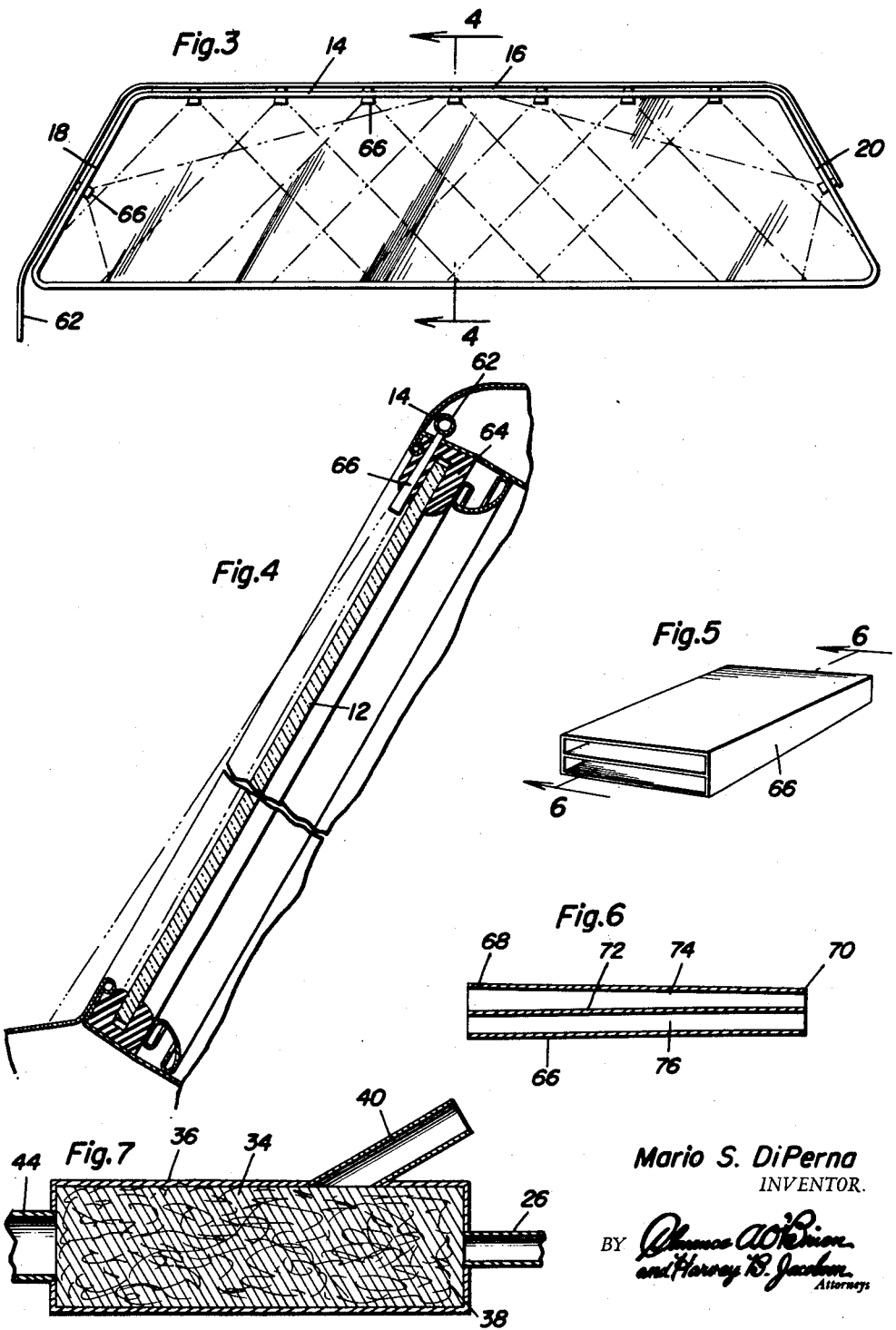

United States Patent Office 2,968,071
Patented Jan. 17, 1961

2,968,071
WINDSHIELD CLEANER
Mario S. Di Perna, 27 Banks St., Somerville, Mass.
Filed Sept. 10, 1958, Ser. No. 760,143
5 Claims. (Cl. 20—40.5)

This invention relates to motor vehicle accessories and more particularly to a windshield cleaner to keep the entire windshield clear from water, frost, fog or snow. Although the invention is described in connection with a windshield, it is understood that this expression is intended to mean any windshield of a motor vehicle, whether it is on the front, back, or even the side (windows), of a motor vehicle.

An object of the invention is to provide a windshield cleaner which maintains the windshield in a clean condition by applying heated air under pressure along the outer surface of the windshield and in a particular pattern.

The invention is practiced by an attachment to the exhaust manifold or some other part of the exhaust system of a motor vehicle whereby gas under pressure may be directed through a gas manifold having a number of nozzles, over the entire area of the windshield. Supplemental air is drawn in through an air filter to mix with the exhaust gases, being heated by the latter before application to the area of the windshield. Further, this invention simplifies a spray attachment for a motor vehicle windshield inasmuch as the same exhaust gases under pressure may be used, by passing through a venturi or some other aspirator, to draw water from a supply thereof and spray it over the windshield to clean the windshield of any foreign matter that accumulates thereon.

The spray pattern of the air under pressure is such that two streams are directed generally across the windshield. One stream is used as a deflector to at least partially deflect some of the snow, rain, etc. away from the windshield and the other stream is to sweep across the surface of the windshield. Both streams are applied simultaneously and in accordance with the desires of the motor vehicle operator.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front and side perspective view of a typical windshield of a motor vehicle equipped with a cleaner attachment in accordance with the invention.

Figure 2 is a diagrammatic view showing the connection of the attachment with portions of the motor vehicle.

Figure 3 is a developed plan view showing principally the spray pattern and especially, how the streams overlap to more effectively maintain the windshield in a cleanly condition.

Figure 4 is an enlarged sectional view taken on the line 4—4 of Figure 3.

Figure 5 is a perspective view of one of the spray nozzles.

Figure 6 is a sectional view taken on the line 6—6 of Figure 5.

Figure 7 is a sectional view of the air filter within which the exhaust gases and fresh air are mixed prior to directing them in the pattern shown in Figure 3 over the windshield surface.

In the accompanying drawings there is a motor vehicle 10 which diagrammatically represents any manufacturer's make, model or style of motor vehicle. The vehicle has a windshield 12 along the upper edge 16 and side edges 18 and 20 thereof. Intake manifold 22 is shown in Figure 3, this being the suggested source of gas under pressure for attachment 24.

Spray attachment 24 consists of a conduit 26 which is threaded or otherwise secured to the intake manifold. Valve 28 is connected in conduit 26 and has a valve operating arm 30 adapted to be actuated from within the motor vehicle. The means for actuating the valve may be varied, one of the simpler means being Bowden wire 32 with a knob control in the motor vehicle. Conduit 26 is connected at one end to filter 34, the latter consisting of a casing 36 with filter material 38 therein. The filter material may be substituted by a cartridge. An air inlet duct 40 is connected at an angle to the longitudinal axis of casing 36 and registers with the filter material 38. Tube 44 is in axial alignment with conduit 36 and is attached to the rear end of the casing 36. The tube 44 contains a venturi 48 or some other type of aspirator. Water conductor 50 is connected with the low pressure part of the aspirator and with a supply container 52 in which water or other solutions are stored. Control valve 54 is connected with the piping between container 52 and the aspirator 48 to control the passing of liquid from container 52 into the aspirator. The control valve 54 may be attached to the pipe 50 on the upstream side of the connection of pipe 50 with the container 52 so that when the valve 54 is opened, supplemental air enters the aspirator. However, when the valve 54 is closed, liquid is drawn from container 52 into the aspirator. When the liquid container fluid flow system is connected in this way, there must be a vent in the top or some other part of container 52 above the water level. The means for operating valve 54 consist of arm 58 to which Bowden wire 60 is attached. The Bowden wire is capable of being operated from within the motor vehicle (Figure 2).

Manifold 14 is composed of tubing 62 that extends from tube 44 and is preferably concealed behind windshield grommet 64 (Figure 4). The tubing extends alongside of the windshield (Figure 3), across the top thereof adjacent to edge 14 and down at least part of the opposite side 20 thereof. A number of nozzles, typical nozzle 66 shown in Figures 5 and 6, are attached to the tubing 62 at spaced places along the length thereof. Each nozzle is preferably passed through or alongside of grommet 62 on the outside surface of windshield 12 and directs the fluid material (air, gas and/or water) across the front surface of the windshield. The spray pattern is shown in Figure 3.

Nozzle 66 is composed of a small flat walled housing having a thicker outer end 68 and a thinner inner end 70. The inner end is connected in an opening 62 while the intermediate part of the nozzle 66 extends through the grommet 64. A longitudinal flat divider or baffle 72 is in the housing of nozzle 66 separating the nozzle into two flat passageways 74 and 76. The substance issuing from the lowermost, that is the passage 76 closer to the windshield, is adapted to issue substance on the surface of the windshield. The substance issuing from passage 74 is slightly in advance of the windshield surface to function as a deflector.

The nozzles at the top of the windshield direct outwardly diverging sprays that overlap each other. The sprays from the nozzles on the sides of the windshield further overlap the spray pattern made by all of the upper nozzles or at least some of the upper nozzles. In this way the windshield is kept clear of foreign substances including ice and snow. Cleaning, therefore, takes place in the broader sense in that not only are bugs, dirt and like foreign substances kept from the windshield or swept therefrom by the spray from the nozzles, but also the attachment functions as a defroster.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a vehicle that has a transparent panel and a source of hot gas, an attachment for cleaning the panel, said attachment comprising a tube connected with said hot gas source, tubing connected with said tube and extending along at least one edge of the panel, a plurality of nozzles attached to said tubing to direct a stream of said gases over the surface of the panel, said nozzles each issuing superposed spray patterns, the spray of one pattern of each nozzle adapted to sweep across the surface of the panel, and the spray of the other superposed pattern of each nozzle overlying the first mentioned pattern to form a deflector, a liquid supply connected with said tube, and control means connected with said liquid supply for exposing the liquid to the rush of gas through said tube to draw liquid from said supply into said tube for admixture with the gas prior to discharge through said nozzles.

2. In a vehicle that has a transparent windshield with a grommet around the edge thereof, an attachment for cleaning the windshield, said attachment comprising a tube adapted to connect with a source of gas under pressure from the motor vehicle, tubing connected with said tube and extending along at least one edge of the windshield and concealed by said grommet, a plurality of nozzles attached to said tubing to direct a stream of said gases over the surface of the windshield, said nozzles each having a pair of superposed passages therein issuing superposed spray patterns beyond the inner edge of said grommet, the spray of one pattern of each nozzle adapted to sweep across the surface of the windshield, and the spray of the other superposed pattern of each nozzle overlying the first mentioned pattern to form a deflector.

3. In a vehicle that has a transparent panel, an attachment for cleaning the panel, said attachment comprising means including a tube adapted to connect with a source of gas under pressure from the motor vehicle, tubing connected with said tube and extending along at least one edge of the panel, a plurality of nozzles attached to said tubing to direct a stream of said gases over the surface of the panel, said nozzles issuing superposed spray patterns, the spray of one pattern adapted to sweep across the surface of the panel, and the spray of the other superposed pattern overlying the first mentioned pattern to form a deflector, an aspirator in said tube, a source of liquid including a liquid tank and a pipe, said pipe connected with said liquid tank and said aspirator to introduce liquid into the stream of gas, and a valve in said pipe upstream of the connection of said pipe with said liquid tank for admitting atmospheric air into said pipe to mix with the liquid.

4. In a vehicle that has a transparent panel, an attachment for cleaning the panel, said attachment comprising means including a tube adapted to connect with a source of gas under pressure from the motor vehicle, tubing connected with said tube and extending along at least one edge of the panel, a plurality of nozzles attached to said tubing to direct a stream of said gases over the surface of the panel, said nozzles issuing superposed spray patterns, the spray of one pattern adapted to sweep across the surface of the panel, and the spray of the other superposed pattern overlying the first mentioned pattern to form a deflector, said means including said tube having an air filter upstream of said tube and downstream of the source of gas under pressure, a supplemental air inlet in said filter to draw air into the filter and admix with the gases, an aspirator in said tube downstream of said filter, a source of liquid including a liquid tank and a pipe separate from said motor, said pipe connected with said liquid tank and said aspirator to introduce liquid into the stream of air and gas, a valve control operatively connected with said pipe, and a valve in said tube upstream of said filter.

5. In a vehicle that has a transparent panel, an attachment for cleaning the panel, said attachment comprising means including a tube adapted to connect with a source of gas under pressure from the motor vehicle, tubing connected with said tube and extending along at least one edge of the panel, a plurality of nozzles attached to said tubing to direct a stream of said gases over the surface of the panel, said nozzles issuing superposed spray patterns, the spray of one pattern adapted to sweep across the surface of the panel, and the spray of the other superposed pattern overlying the first mentioned pattern to form a deflector, said means including said tube having an air filter upstream of said tube and downstream of the source of gas under pressure, a supplemental air inlet in said filter to draw air into the filter and admix with the gases, an aspirator in said tube downstream of said filter, a source of liquid including a liquid tank and a pipe separate from said motor, said pipe connected with said liquid tank and said aspirator to introduce liquid into the stream of air and gas, the panel having a grommet extending around its periphery, and said nozzle passed through a portion of said grommet so that said tubing is concealed on one side of the grommet.

References Cited in the file of this patent

UNITED STATES PATENTS

| 1,441,238 | Morris | Jan. 9, 1923 |
| 1,635,464 | Delfeld et al. | July 12, 1927 |
| 2,178,006 | Smith | Oct. 31, 1939 |
| 2,533,000 | Duncan | Dec. 5, 1950 |